United States Patent
Dunn

(10) Patent No.: US 11,283,323 B2
(45) Date of Patent: Mar. 22, 2022

(54) SELF-FIXTURING JUMPER BRIDGE FOR ELECTRIC MACHINE STATOR

(71) Applicant: Ford Global Technologies, LLC, Dearborn, MI (US)

(72) Inventor: Casey Taylor Dunn, Brownstown Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 239 days.

(21) Appl. No.: 16/288,601

(22) Filed: Feb. 28, 2019

(65) Prior Publication Data

US 2020/0280234 A1 Sep. 3, 2020

(51) Int. Cl.
*H02K 3/52* (2006.01)
*H02K 3/28* (2006.01)

(52) U.S. Cl.
CPC .............. *H02K 3/521* (2013.01); *H02K 3/28* (2013.01); *H02K 2203/06* (2013.01); *H02K 2203/09* (2013.01)

(58) Field of Classification Search
CPC ........................... H02K 3/487; H02K 2203/15
USPC .......................................... 310/71, 201, 208
See application file for complete search history.

(56) References Cited

U.S. PATENT DOCUMENTS

| 5,774,987 | A * | 7/1998 | Chadbourne | ........ H01R 4/5083 29/897.35 |
| 8,508,088 | B2 | 8/2013 | Sugiyama et al. | |
| 8,519,583 | B2 | 8/2013 | Sakaue et al. | |
| 2013/0200743 | A1 * | 8/2013 | Okimitsu | ................. H02K 3/12 310/201 |
| 2015/0017845 | A1 * | 1/2015 | Tomita | ................... H01R 4/186 439/879 |
| 2015/0022046 | A1 * | 1/2015 | Shibata | .................... H02K 3/12 310/208 |
| 2015/0222046 | A1 * | 8/2015 | Akiguchi | ............... H01R 13/10 439/382 |
| 2016/0181881 | A1 * | 6/2016 | Magri | ...................... H02K 3/12 310/71 |
| 2017/0288318 | A1 | 10/2017 | Neet et al. | |

FOREIGN PATENT DOCUMENTS

EP 3088124 A1 * 11/2016 ......... H02K 15/0081

* cited by examiner

*Primary Examiner* — Jose A Gonzalez Quinones
(74) *Attorney, Agent, or Firm* — David B. Kelley; Brooks Kushman P.C.

(57) ABSTRACT

A stator of an electric machine has first and second hairpin winding terminals connected with a first electrical phase and extending axially away from end windings of the stator. A hairpin winding of a second electrical phase is located circumferentially between the first-phase terminals and spaces them from one another. A jumper has spaced-apart C-hooks oriented face-to-face relative to one another and wrapping around respective exposed ends of the first-phase hairpin winding terminals. The jumper forms a bridge spanning between the first-phase hairpin winding terminals and over the second-phase hairpin winding terminal. During manufacturing of the stator, the C-hooks are slid axially downward onto respective non-insulated ends of the first-phase stator hairpin winding terminals. The C-hooks abut against and are axially positioned relative to the first-phase terminals by ledges defined by insulative coatings that cover portions of the first-phase hairpin winding terminals.

8 Claims, 5 Drawing Sheets

SELF-FIXTURING JUMPER BRIDGE FOR ELECTRIC MACHINE STATOR

TECHNICAL FIELD

The present disclosure relates to stator assemblies used in electric machines (such as motors and generators) and to such a stator assembly having a jumper bridge that enables a simplified stator manufacturing process.

BACKGROUND

The manufacture of a stator assembly of an electric machine typically includes a large number of bonds (usually comprising welded or soldered joints) to achieve electrical continuity between terminals of the hairpin windings and/or other circuit components that make up the stator assembly. In one known manufacturing process, the necessary welds are performed in two stages or steps: In the first step, many dozens (exceeding approximately 200 in some cases) of welds are performed, each bonding together two immediately adjacent (usually touching) hairpin terminals. In the second step, a smaller number of welds are performed to bond certain of the hairpin terminals with circuit components other than an immediately adjacent hairpin terminal. These welds in step 2 (sometimes referred to as "special welds" to distinguish from the simpler welds made in step 1) may involve the bonding of jumper bridges, neutral bridges, terminal lugs, and terminal leads with hairpin terminals.

The jumper bridges, neutral bridges, and/or terminal lugs are typically formed as metal stampings and previously known assembly processes have required intricate and expensive fixturing to hold these stamped components in their proper positions relative to the hairpin terminals as the special welds are performed. Such fixturing may increase cycle time and/or cost of the manufacturing process. Due to the number and relatively complex geometries of the above-identified circuit components that require fixturing to properly position and weld those components, there is a need to simplify the fixturing process for these components.

SUMMARY

In an embodiment disclosed herein, a stator of an electric machine comprises first and second hairpin winding terminals connected with a single or common electrical phase of the machine (referred to as first-phase hairpin winding terminals) and extending axially away from end windings of the stator. At least one hairpin winding associated with an electrical phase different from that of the first-phase windings (referred to as a second-phase hairpin winding terminal) is located between the first-phase terminals and spaces them circumferentially from one another.

A unitary jumper comprises spaced-apart C-hooks are oriented face-to-face relative to one another and that wrap around and are bonded with respective exposed ends of the first-phase hairpin winding terminals. The C-hooks abut against and are axially positioned relative to the first-phase terminals by ledges defined by insulative coatings that cover the axially-lower portions of the first-phase hairpin winding terminals. The jumper forms a bridge spanning between the first-phase hairpin winding terminals and over the second-phase hairpin winding terminal.

In a further disclosed embodiment, a method of manufacturing a stator of an electric machine comprises sliding a pair of face-to-face and spaced-apart C-hooks of a unitary jumper axially (parallel to a central axis of the stator) onto respective non-insulated ends of respective stator hairpin winding terminals of a common or same electrical phase of the machine. The stator hairpin winding terminals are circumferentially separated by one or more stator hairpin winding terminals of a different phase of the machine and extend away from end windings of the stator. The C-hooks slide over/onto their respective same-phase terminals until the unitary jumper contacts and seats against ledges defined by insulative coatings on axially lower portions of the same-phase stator hairpin winding terminals. When seated on the ledges, the jumper forms a bridge that spans between the same-phase stator hairpin winding terminals and over the different-phase stator hairpin winding terminals. The C-hooks are then bonded (by welding, for example) with the respective exposed ends of the respective terminals.

When the C-hooks are slid onto the same-phase terminals, a bridge portion of the jumper between the C-hooks may be located radially inward of the terminals. The bridge may further span over a terminal lead connected with a terminal lug located radially outward from an armature of the stator.

The jumper may be formed by bending opposite ends of a stamped metal strap out of the plane of the stamping to form the C-hooks.

DETAILED DESCRIPTION

Figure 1:
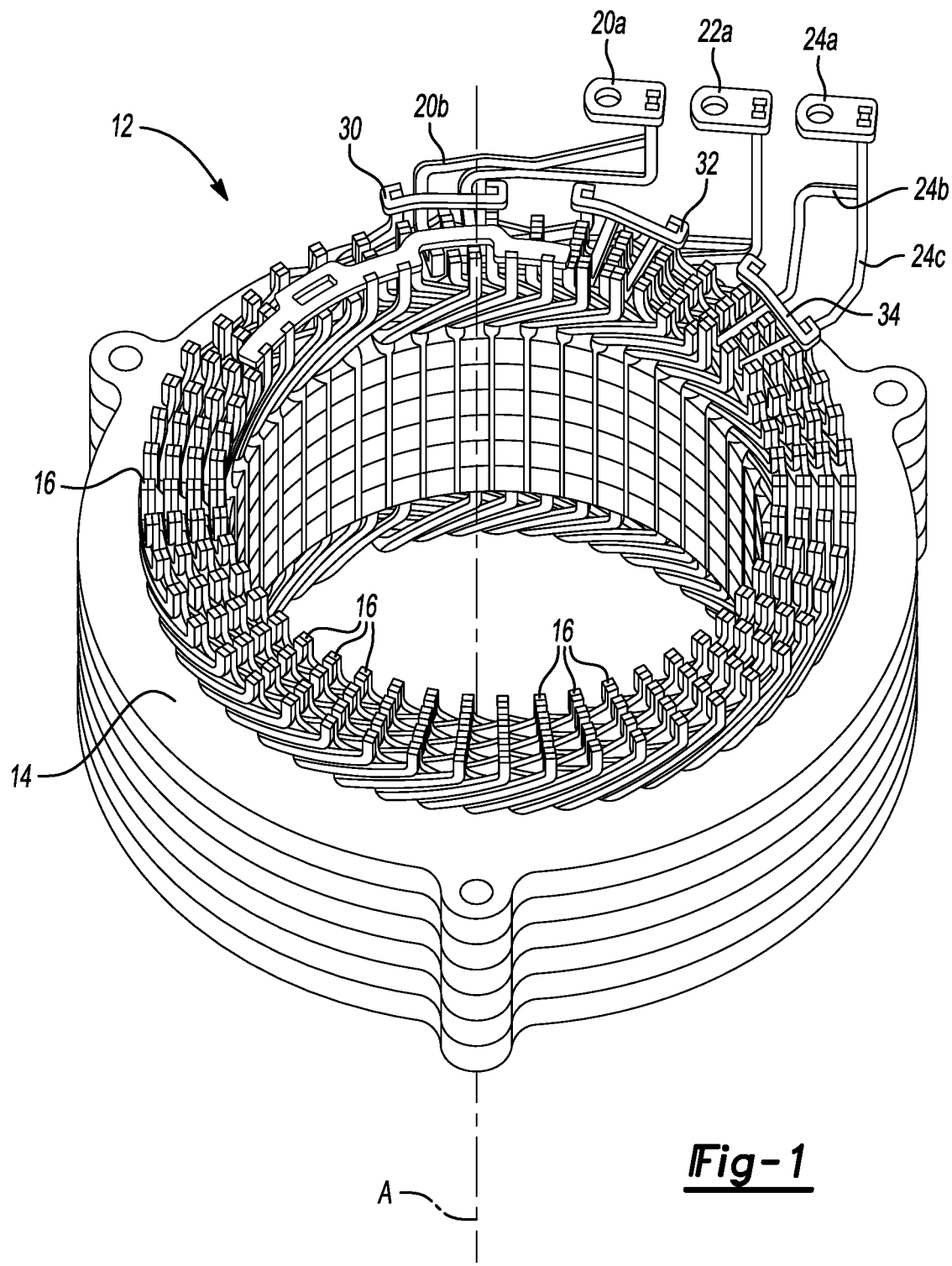
FIG. 1 is a simplified view of components of a stator assembly according to the present disclosure.

Referring to FIG. 1, a stator assembly 12 of an electric machine (specifically, a 3-phase electric motor) is shown to generally comprises a generally ring-shaped armature 14 and a plurality of hairpin windings 16, the terminal ends of which project from a generally planar end surface of the armature to comprise the stator end windings. This end winding surface of the armature visible in FIG. 1 is hereinafter referred to as the armature's upper surface. Stator assembly 12 is shown in isolation from related components of a complete and functional electric machine but that are not pertinent to the present disclosure. Among the non-pertinent and omitted components are a rotor (that is positioned inside of armature 14 and in alignment with a central axis A of the stator assembly) and a housing (that encloses the armature 14 and windings 16).

Terms such as "axial," "axially," "circumference," "circumferentially," "radial," and "radially" are used herein in reference to the central axis A of the stator assembly 12 and to the circumference of the armature 14.

As is well known in the art, each hairpin winding 16 is an electrically conductive, generally U-shaped wire that is inserted from the bottom (as viewed in FIG. 1) of the armature 14 and passes therethrough such that the two distal ends of each winding project from the upper surface of the armature and, in a group, comprise the end windings of the stator. The wire used to form the hairpin windings may be of a rectangular cross-section, as shown, or may be of any other appropriate cross-section, such as circular. The portion of each winding 16 that extends away from the armature upper surface is routed radially and/or circumferentially to position the terminal portion of each winding at an appropriate location where it may be bonded to another winding terminal (and/or to other circuit components, as described in further detail below) to form electrical circuits that enable the desired functioning of the electrical machine. The term "bonded" is hereby defined as including any conventionally-known method of achieving a physically secure electrical connection between two metal terminals, to include welding and soldering.

Figure 2:
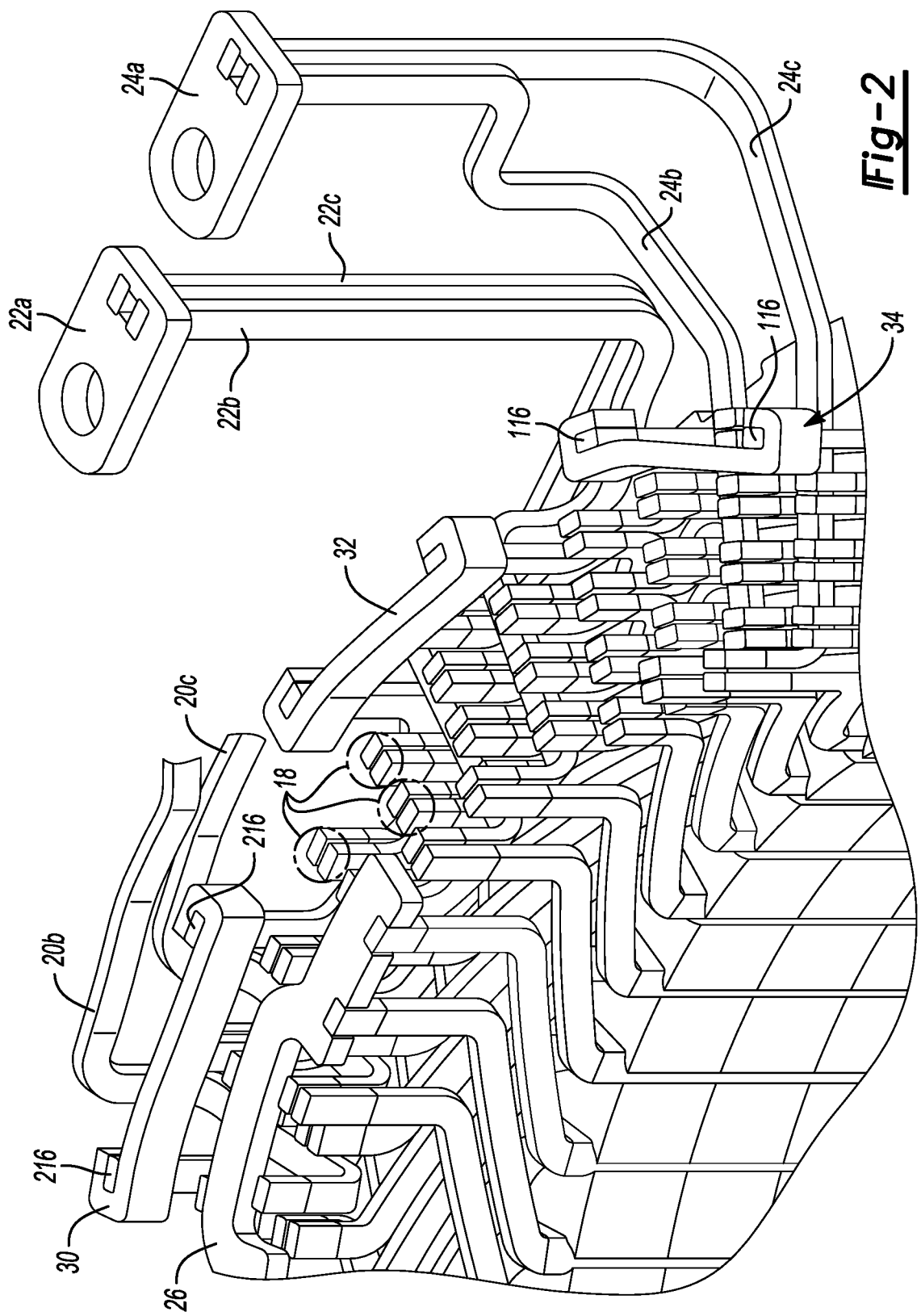
FIG. 2 is a magnified perspective view of a portion of the stator assembly depicted in FIG. 1.

Hairpin windings 16 are coated with a thin, electrically insulative coating (such as enamel or varnish) except for the ends or tips thereof where bonding is necessary. These exposed (non-insulated) ends or tips are referred to as terminals. As is well known in the art, a majority of the hairpin winding terminals are disposed to form connection pairs 18 (see FIG. 2) comprising two windings of the same phase that are touching (or in very close proximity with) one another. This contact (or near contact) of the exposed terminals of each connection pair 18 enables the bonding together (typically by welding) of the two terminals to achieve electrical continuity.

In a conventional configuration of an electric machine stator, connection pairs 18 are disposed in multiple radially-extending rows. In a known method of manufacturing stator assembly 12, the terminals of all (or substantially all) of the connection pairs 18 are bonded together in a first bonding step or stage.

Stator assembly 12 further comprises a plurality of terminal lugs 20a, 22a, 24a (in the disclosed embodiment, one for each phase of the three-phase motor) and related terminal leads 20b, 20c, 22b, 22c, 24b, 24c. Each pair of terminal leads is bonded to its respective terminal lug 20a, 22a, 24a and to particular hairpin windings to place the lugs in electrical connection with circuits of the appropriate motor phase. The particular hairpin winding terminals to which the terminal leads are bonded may be located higher (farther in the axial direction) from the armature upper surface than the majority of the connection pairs 18 which comprise the end windings. This difference in the axial location of the terminals to be bonded to the terminal leads is to improve the ease of manufacture of the stator assembly 12.

Stator assembly 12 further comprises a neutral bridge 26 bonded to terminals of designated hairpin winding 16 as necessary to provide circuit continuity. Terminal lugs 20a, 22a, 24a and neutral bridge 26 may be formed (as is well known in the art) from sheet metal by a stamping process. The designated hairpin winding terminals to which neutral bridge 26 is bonded may be located higher (farther in the axial direction) from the armature end surface than the terminals forming the connection pairs 18, this difference enabling the bonding of the neutral bridge to the designated terminal.

In a known manufacturing process, bonding of the terminal leads 20b, 20c, 22b, 22c, 24b, 24c and neutral bridge 26 to the appropriate hairpin winding terminals requires the use of fixturing (not shown) to retain the components in their desired positions relative to one another as the bonding takes place.

Stator assembly 12 further comprises a plurality of jumper bridges 30, 32, 34. The depicted embodiment comprises one jumper bridge for each phase of the three-phase motor, each jumper bridge electrically connecting two hairpin windings of the same phase in series. The following description of junction bridge 34 preferably (but not necessarily) also applies to one or more of the other junction bridges 30, 32.

Figure 3:
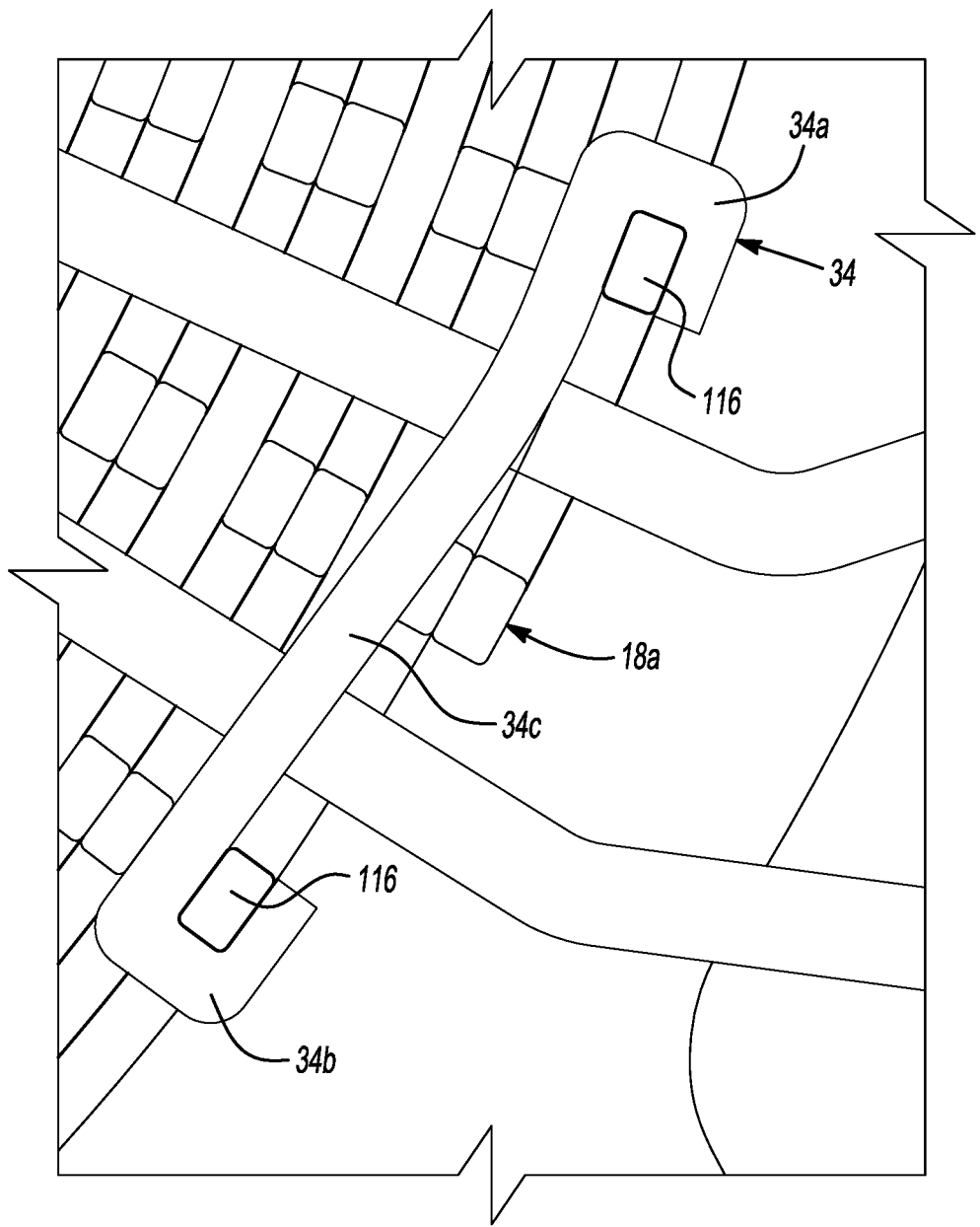
FIG. 3 is an axially downward-looking view of one of the disclosed jumper bridges.

Referring now to FIG. 3, junction bridge 34 is a unitary component comprising a centrally-located bridge 34c and two C-hooks 34a, 34b integral with the bridge at either end thereof. The C-hooks 34a, 34b are oriented face-to-face relative to one another; that is, the open sides or portions of the two C-hooks face inwardly and toward one another. The depicted configuration may be achieved in a process comprising one or more stamping and/or bending steps.

Junction bridge 34 electrically connects two terminals 116 that are of a same electrical phase and (due to geometry of the stator assembly and requirements of the stator's circuitry for proper functioning of the motor) are separated by at least one intervening connection pair 18a of terminals. That is, junction bridge 34 electrically connects two terminals 116 of a single, common, or same electric phase that are located in non-adjacent radially-extending rows of winding terminals, such that the junction bridge extends or spans over/above one or more intervening connection pair 18a. Accordingly, the hairpin winding terminals 116 to which junction bridge 34 is bonded extend higher and are located farther (in the axial direction) from the armature upper surface than is the case for the terminals of the intervening connection pair 18a. The intervening connection pair 18a is of a second phase, different from than the terminals 116, and therefore no electrical contact may exist between those components.

Junction bridge 34 also spans above or over lug terminals 24b, 24c

Figure 4:
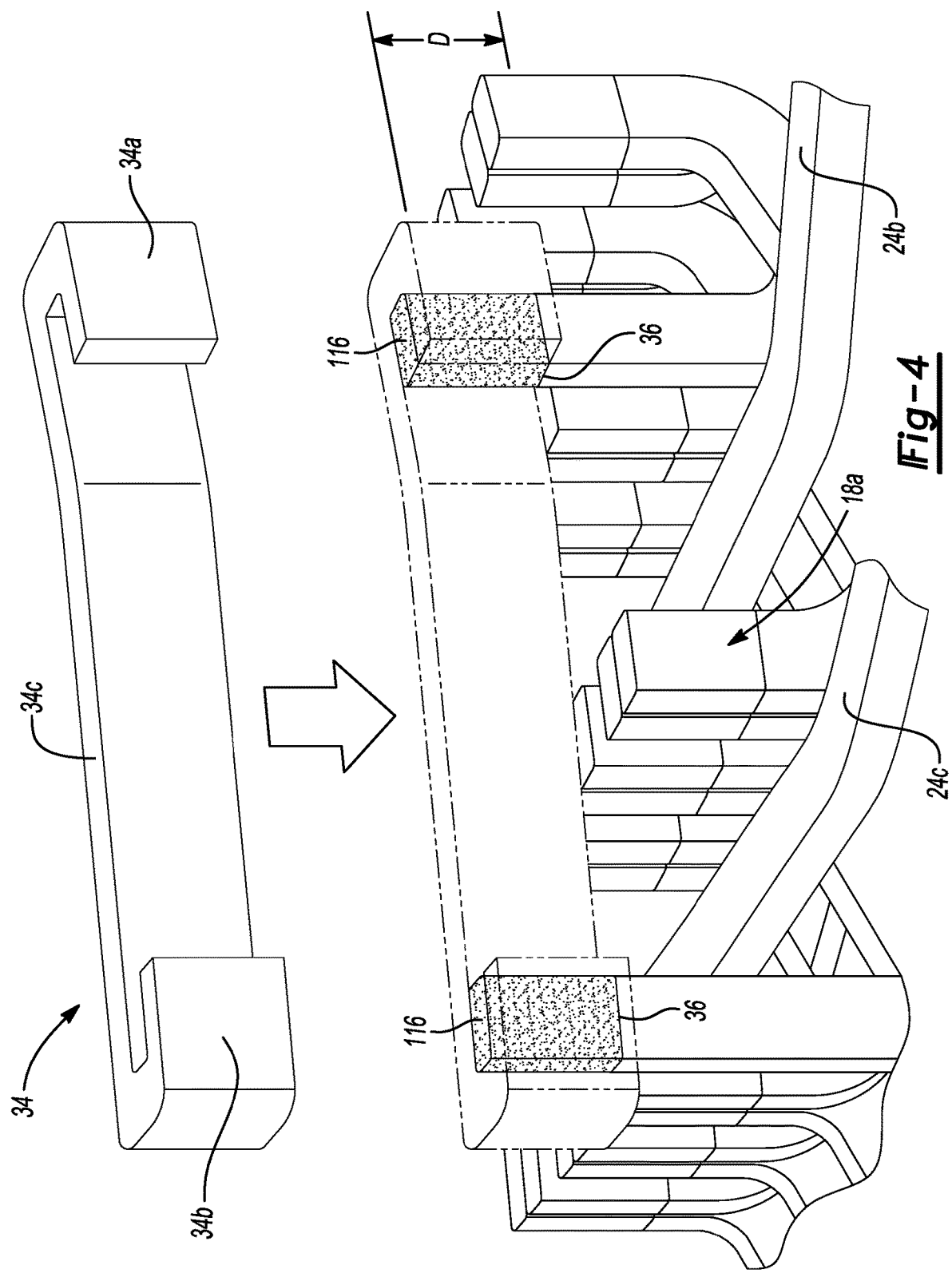
FIG. 4 is a perspective view (looking approximately radially inward) of the jumper bridge shown in FIG. 3.

Bonding of junction bridge 34 with its associated same-phase terminals 116 is achieved without the need of any fixturing by the following method. As depicted in FIG. 4, junction bridge 34 is positioned such that the C-hooks 34a, 34b are above and in axial alignment with respective terminals 116, then the junction bridge is moved downward/axially relative to the terminals so the C-hooks slide over their respective terminals (as shown in phantom lines). Each C-hook thereby encircles and contacts three (of the four) sides of its respective terminal to thereby enhance electrical continuity.

The downward sliding movement of the C-hooks 34a, 34b relative to the terminals 116 is stopped when the C-hooks butt against and are seated on ledges 36 (FIG. 4) formed around the periphery of the terminals. Ledges 36 are defined by uppermost edges of the insulative coating covering the hairpin windings immediately below the exposed (non-insulated) portions of terminals 116. These ledges 36 have a width approximately equal to the thickness of the insulative coating, which may be on the order of 100 microns. The vertical/axial dimensions of the exposed terminals 116 are preferably equal to the corresponding dimensions of junction bridge 34 so that uppermost surfaces thereof are flush with one another (see FIG. 4) when the C-hooks 34a, 36b are seated against the ledges 36.

This abutting contact between the lowermost surfaces of the C-hooks 34a, 34b and the ledges 36 (in combination with any static friction between the inner surfaces of the C-hooks and the outer surfaces of terminals 116) locates and retains the junction bridge in the correct position for a subsequent bonding operation. Therefore, no fixturing is required (as in the prior art) to properly complete the bonding of junction bridge 34 to terminals 116. This greatly simplifies the overall manufacturing process of the stator assembly, reducing the production time and cost of thereof.

Figure 5:
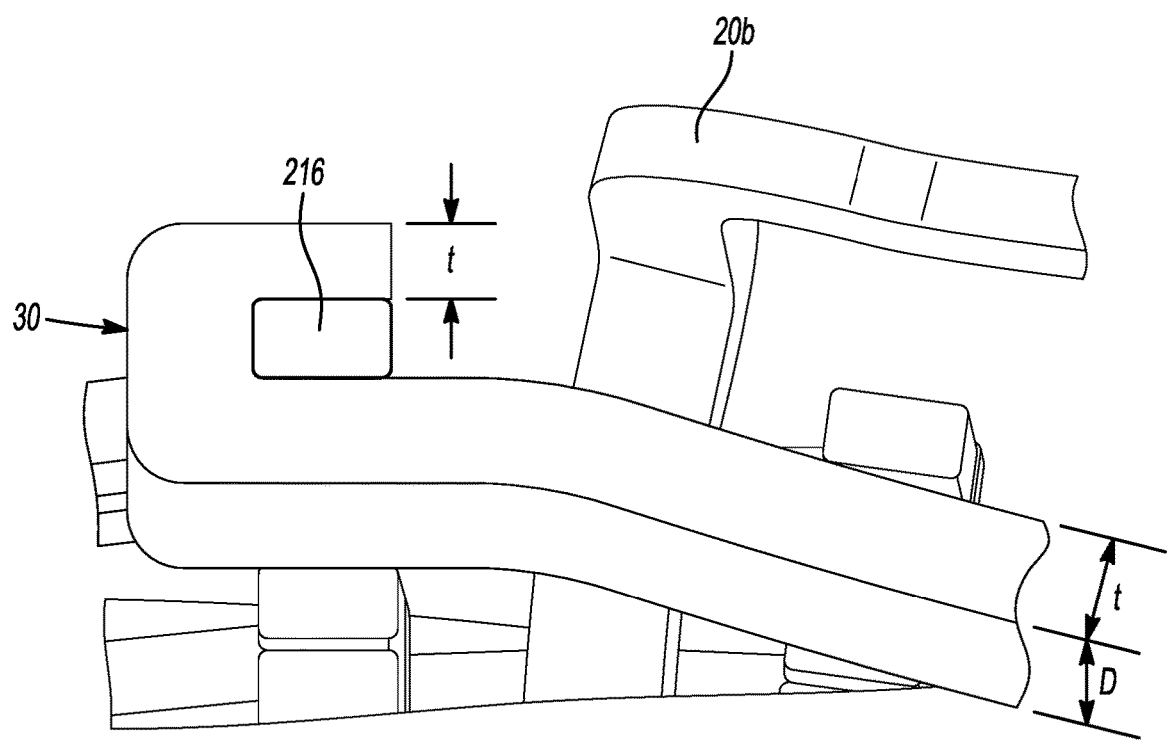
FIG. 5 is a perspective view (looking approximately axially downward) of a second of the jumper bridges shown in FIGS. 1 and 2.
Figure 6:
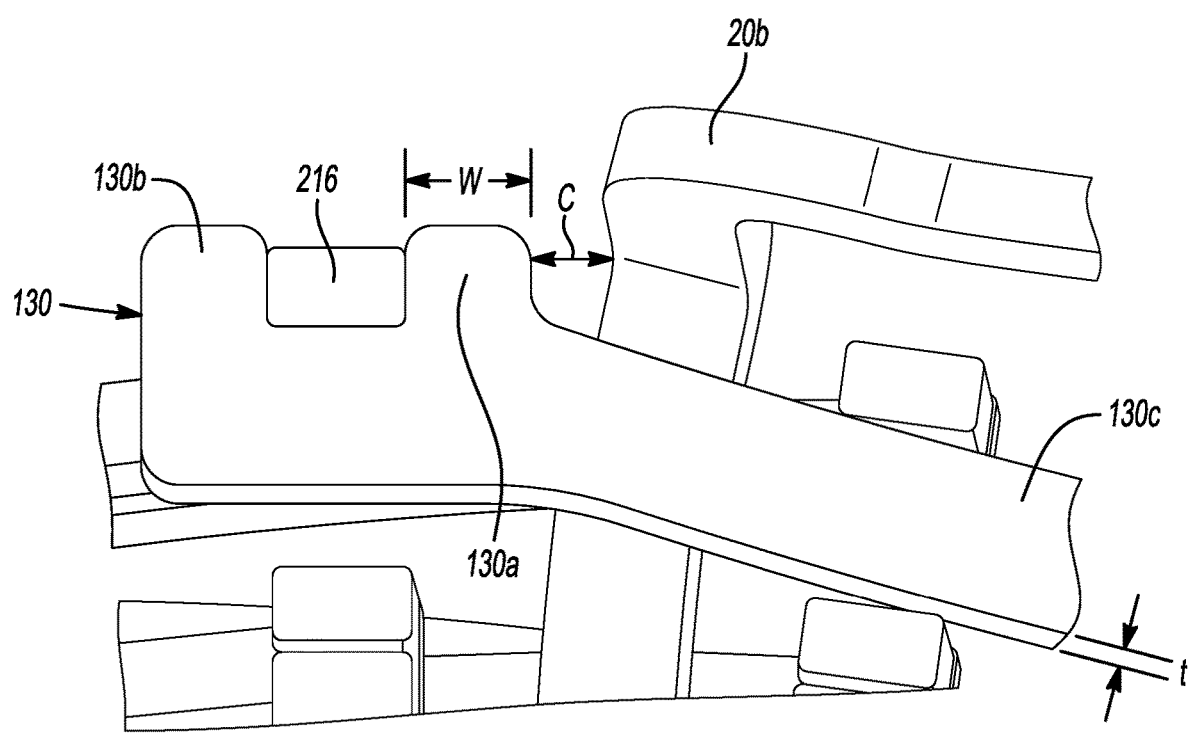
FIG. 6 is a view of a prior art jumper bridge in an installation otherwise similar to that of FIG. 5.

An additional advantage of the disclosed junction bridge configuration and assembly method may be seen in a comparison of FIGS. 5 and 6. FIG. 5 is an enlarged view of the junction bridge 30 according to the present disclosure seated over terminals 216, while FIG. 6 shows a known prior art junction bridge 130 installed in the same location in a stator assembly having the otherwise identical configuration.

The prior art junction bridge 130 (FIG. 6) is stamped from sheet metal (of thickness t) to form a bridge 130c and a pair of tabs 130a, 130b extending radially outward at each end thereof (only one pair of tabs being shown in FIG. 6) to bracket the terminal 16b. A known concern in this prior art configuration is that dimensional tolerance issues inherent in the stamping procedure used to form prior-art junction bridge 132 may make it difficult to ensure that a width W of the inboard tab 130a is consistently small enough to provide a desired clearance distance C between the tab 130a and the terminal lead 20b. For example, in a commonly-used stamping process the width W must be no less than 1.5 times the stamped thickness t of the junction bridge 130. Similar tolerance/clearance issues may also exist at other locations in relation to one or more of the other junction bridges.

As seen in FIG. 5, no portion of the currently disclosed junction bridge 30 is located directly between the terminal 216 and the terminal lead 20b, so that the manufacturing tolerance issue discussed above is of no concern.

It is also apparent from a comparison of FIGS. 5 and 6 that the present junction bridge 30, 32, 34 makes possible a much greater contact area between the junction bridge and the connected terminals 16. The contact area provided by the prior art junction bridge 130 is limited by its stamped thickness t which brackets the terminals, because the tabs 130a, 130b lie in the stamping plane of the stamping and so are no thicker than the metal sheet from which stamping is made. In comparison, the currently-disclosed junction bridge 30 may easily be designed and manufactured such that the width dimension D (see FIG. 4) is significantly greater than its stamped thickness t. This is due to the fact that the C-hooks of the present junction bridges 30, 32, 34 are bent out of the stamping plane of the sheet of metal from which the part is stamped.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A stator of an electric machine comprising:
first and second first-phase hairpin winding terminals extending axially away from end windings of the stator;
at least one second-phase hairpin winding terminal located between and circumferentially spacing the first-phase hairpin winding terminals from one another; and
a unitary jumper having face-to-face and spaced-apart C-hooks wrapping around and bonded with respective exposed ends of the first-phase hairpin winding terminals, the unitary jumper contacting ledges defined by insulative coatings on portions of the first-phase hairpin winding terminals, and the jumper forming a bridge spanning between the first-phase hairpin winding terminals and over the second-phase hairpin winding terminal.

2. The stator of claim 1, further comprising a terminal lead passing between the first and second hairpin winding terminals, the bridge further spanning over the terminal lead.

3. The stator of claim 1, wherein the jumper is formed by bending opposite ends of a stamped metal strap out of a stamping plane to form the C-hooks.

4. The stator of claim 1, wherein a bridge portion of the jumper between the C-hooks is located radially inward of the first-phase hairpin winding terminals.

5. A stator of an electric machine comprising:
first and second first-phase hairpin winding terminals extending axially away from end windings of the stator;
at least one second-phase hairpin winding terminal located between and circumferentially spacing the first-phase hairpin winding terminals from one another; and
a unitary jumper having face-to-face and spaced-apart C-hooks wrapping around and bonded with respective exposed ends of the first-phase hairpin winding terminals, the unitary jumper being seated in direct contact with and carried by ledges defined by insulative coatings on portions of the first-phase hairpin winding terminals and configured to position the unitary jumper relative to the respective exposed ends such that top surfaces of the unitary jumper and respective exposed ends are flush with one another, and the jumper forming a bridge spanning between the first-phase hairpin winding terminals and over the second-phase hairpin winding terminal.

6. The stator of claim 5, further comprising a terminal lead passing between the first and second hairpin winding terminals, the bridge further spanning over the terminal lead.

7. The stator of claim 5, wherein the jumper is formed by bending opposite ends of a stamped metal strap out of a stamping plane to form the C-hooks.

8. The stator of claim 5, wherein a bridge portion of the jumper between the C-hooks is located radially inward of the first-phase hairpin winding terminals.

\* \* \* \* \*